(12) United States Patent
Lota et al.

(10) Patent No.: US 11,669,947 B2
(45) Date of Patent: Jun. 6, 2023

(54) MACHINE LEARNING ASSISTED IMAGE ANALYSIS

(71) Applicant: TOYOTA MOTOR NORTH AMERICA, INC., Plano, TX (US)

(72) Inventors: Charan Lota, Plano, TX (US); Hazem Ahmed, Plano, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 592 days.

(21) Appl. No.: 16/273,520

(22) Filed: Feb. 12, 2019

(65) Prior Publication Data

US 2020/0258208 A1 Aug. 13, 2020

(51) Int. Cl.
*G06T 7/00* (2017.01)
*G06N 20/00* (2019.01)
*G06T 7/90* (2017.01)

(52) U.S. Cl.
CPC ........... *G06T 7/0002* (2013.01); *G06N 20/00* (2019.01); *G06T 7/90* (2017.01); *G06T 7/97* (2017.01); *G06T 2207/20081* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 5,057,913 A | * | 10/1991 | Nagata | G03B 15/003 347/232 |
| 6,320,654 B1 | * | 11/2001 | Alders | G01N 21/8806 356/237.2 |
| 9,824,453 B1 | | 11/2017 | Collins | |
| 9,984,307 B2 | | 5/2018 | Kato | |
| 2017/0277979 A1 | * | 9/2017 | Allen | G06K 9/6256 |
| 2017/0293894 A1 | * | 10/2017 | Taliwal | G06K 9/6201 |
| 2019/0095877 A1 | * | 3/2019 | Li | G06Q 10/20 |
| 2020/0034958 A1 | * | 1/2020 | Campbell | G06Q 10/10 |

FOREIGN PATENT DOCUMENTS

WO WO 2017014320 A1 * 1/2017
WO 2018055340 3/2018

OTHER PUBLICATIONS

Arnal et al., "Detecting Dings and Dents on Specular Car Body Surfaces Based on Optical Flow," Journal of Manufacturing Systems (45) 306-321 (2017).
Jayawardena, "Image Based Automatic Vehicle Damage Detection," (doctoral thesis) (Nov. 2013).

* cited by examiner

*Primary Examiner* — Vikkram Bali
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for detecting surface aberrations on a vehicle. The surface aberrations may not be readily apparent to the human eye. Machine learning constructs image detecting systems to automate the detection of surface aberrations on the vehicle. Additionally, the machine learning may refine the aberration detection systems to identify the cause of the surface aberration on the vehicle and enhance the capabilities of the aberration detection systems.

20 Claims, 6 Drawing Sheets

MACHINE LEARNING ASSISTED IMAGE ANALYSIS

TECHNICAL FIELD

The present disclosure relates generally to imaging technology. In particular, some implementations may relate to enhancing image analysis by leveraging machine learning techniques.

DESCRIPTION OF RELATED ART

A vehicle may have surface aberrations, such as scratches, blemishes, or faint cracks. However, these surface aberrations on rubber, glass, metal, or painted surfaces are not always readily or immediately visible to the human eye. Environmental factors, such as sunlight or overcast skies, may obscure the view of a vehicle and make accurate detection of damage difficult. Accurate detection of the color, texture, and overall appearance of the different surfaces of the vehicle are of paramount importance to different entities. For example, consumers, manufacturers, car dealerships, and rental car agencies do not want vehicles with blemishes, scratches, or faint cracks on vehicle surfaces. Even if not readily apparent to the naked eye, these surface aberrations are still present and may be indicative of unsafe driving or questionable manufacturing processes. Car rental agencies, for example, may want to charge for vehicle damage, therefore damage detection analysis may be important. Automobile manufacturers or auto body shops may want to look at surface imperfections and aberrations as part of their quality control, which can lead back to improvements in their processes. Certain driving or parking behaviors, or a driver's environment may lead to vehicle damage. Thus, insurance companies can ascertain which drivers may engage in higher-risk practices and adjust premiums accordingly.

BRIEF SUMMARY OF THE DISCLOSURE

According to various embodiments of the disclosed technology, methods and systems are provided for identifying aberrations in a vehicle's surface through captured images. A baseline is generated based on reference images of the vehicle's surface. At a point later, a camera system can obtain images of the vehicle's surface. An aberration detection system compares the captured images against the baseline to determine whether there is a difference between the two data sets. If a difference is detected, the one or more captured images are characterized as containing one or more aberrations on the vehicle's surface. The aberration detection system can also identify an aberration source based on the captured images. Training sets may be used with machine learning to analyze the captured images to identify the one or more aberrations. Where there is a high correlation between a training set associated with an aberration source, the aberration detection system can determine that the aberration was caused by the aberration source.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
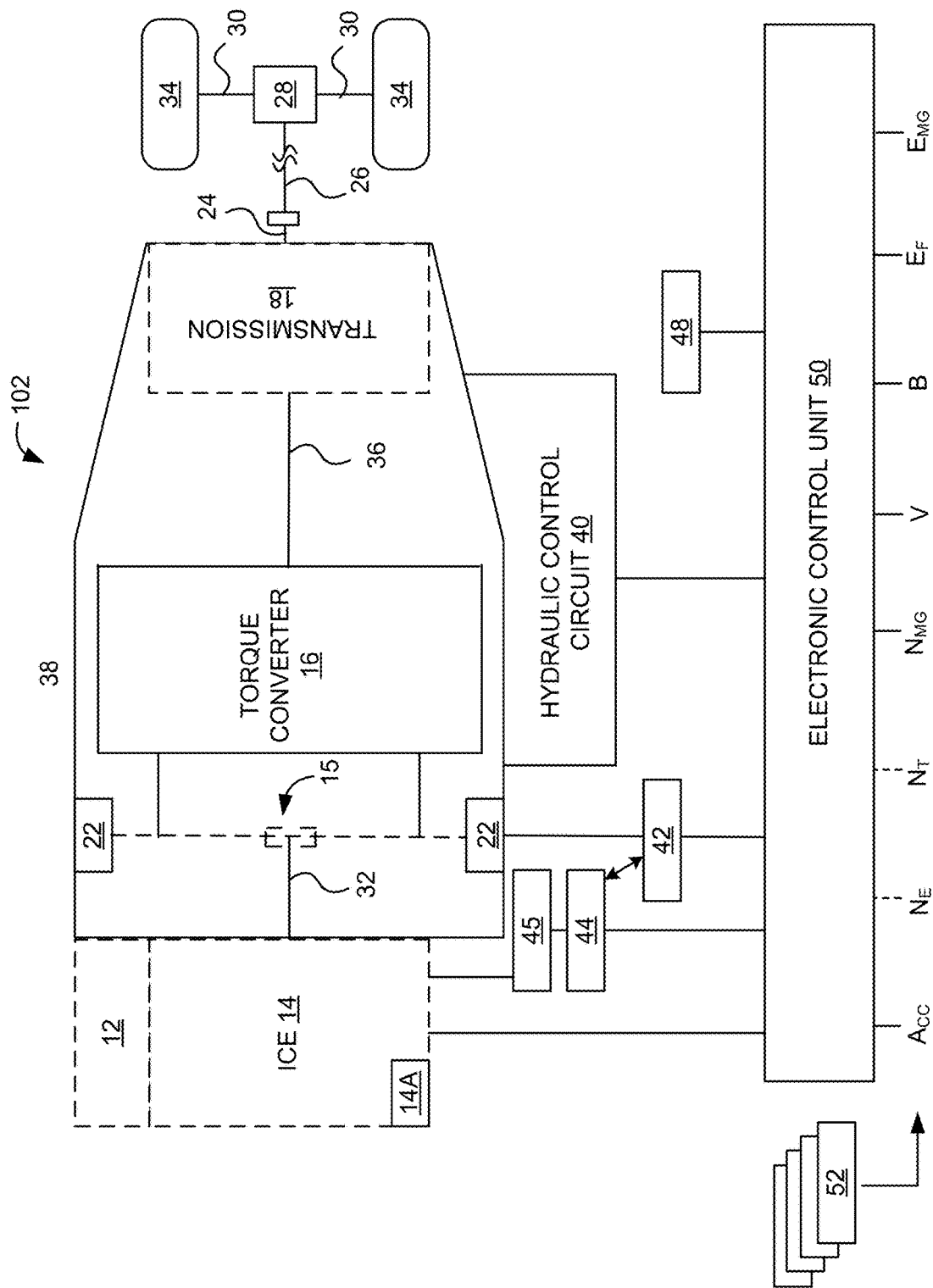
FIG. 1 is a schematic representation of an example vehicle with which embodiments of the systems and methods disclosed herein may be implemented.

The figures are not exhaustive and do not limit the present disclosure to the precise form disclosed.

DETAILED DESCRIPTION

Embodiments of the systems and methods disclosed herein can provide automated aberration detection and analysis of surface aberrations. The surface aberration may or may not be readily visible to the naked eye. For example, some aberrations may be obscured by reflective surfaces or surrounded by other surface features, and accordingly are not readily visible to the human eye. Therefore, the human eye may not be able to consistently and accurately detect such surface aberrations. Embodiments of the systems and methods disclosed herein apply machine learning techniques to images of the surfaces of, for example, vehicular systems (e.g., a car, plane, boat, and motorcycle.) The surfaces may be glass, metal, paint on metal, rubber, plastic, leather, or any type of material used in vehicular systems. An aberration detection system utilizes machine learning techniques to derive training and testing sets. The training and testing sets may examine multiple images of surfaces with and without aberration, such that the aberration detection system may distinguish between the surfaces with and without aberrations. Additionally, aberration detection system can generate a baseline comprising images without aberrations. The baseline is used to compare high resolution images of surfaces obtained from high energy optics, camera phones, digital cameras, and vehicular cameras.

Accordingly, the differences between images (i.e., image deltas) may be determined by comparing the baseline established by the aberration detection system to the obtained high-resolution images. Image delta values may be measured to determine if a surface aberration is present. The magnitude of image delta values may indicate the severity of the aberration. Image delta values for a determined threshold may, for example, indicate surface aberrations warranting action.

In further embodiments, machine learning techniques can be used to predict a cause or source of the detected surface aberrations. For example, machine learning techniques can be applied to data sets from known incidents as training set for the aberration detection system so that causes can be predicted based on the effect. For example, aberration parameters such as aberration geometry (e.g., size, shape, depth, etc.), aberration location (e.g., bumper, fender, quarter panel, decklid, door, rim, etc.), aberration type (e.g., scratch, crease, dent, ding, etc.) and other aberration parameters can be tracked, as can unknown causes for damage. These characteristics can be correlated using machine learning techniques to predict a cause for an aberration based on the aberration parameters. The causes that can be tracked and correlated with resultant damage can include causes such as accident type (e.g., fender bender, scrape, curb rash, door ding etc.) accident environment (e.g., off-road driving, parking lot, street parking, etc.) and accident geography were geo-fence (e.g., particular parking lot, city or region, particular roads, etc.).

The systems and methods disclosed herein may include detectors that compare the hue, saturation, lightness, or other image characteristics of pixels representing a portion of the car to pixels representing another portion of the car, or to pixels of baseline images. If differences are detected, this suggests that there was an aberration. As noted above, image deltas between a captured image and the baseline set as aberration detection system could indicate the presence of an aberration and can be used to gauge the severity of the aberration. Machine learning techniques may also be used to detect or predict the likelihood of the presence of an aberration. For example, machine learning techniques can be used to train the aberration detection system for detecting aberrations based on image characteristics. By using machine learning and imaging techniques of the systems and methods herein, better prediction may be obtained in some circumstances and aberrations otherwise difficult to detect with the naked eye might become detectable.

Also, systems and methods may be implemented in which an operator does not need to manually use a detector to determine if a surface aberration is present. Systems and methods may also be implemented to gather one or more images of large portions of, or the entirety of, the vehicle and to perform image processing to locate aberrations that might not be readily visible to the naked eye. These systems and methods may be configured to eliminate the tedious and laborious nature of having to search for imperfections manually.

FIG. 1 is a schematic representation of an example vehicle with which the systems and methods disclosed herein may be implemented. Vehicle 100 may represent a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for automated aberration detection of surface aberrations can be implemented in other types of vehicle including gasoline- or diesel-powered vehicles, fuel-cell vehicles, electric vehicles, or other vehicles.

FIG. 1 illustrates a drive system of vehicle 100 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 100 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 100 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 100 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units or using a single electronic control unit.

In the example illustrated in FIG. 1, electronic control unit 50 receives information from a plurality of sensors included in vehicle 100. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 100 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as examples of vehicle systems with which embodiments of the disclosed technology may be implemented. One of ordinary skill in the art reading this description will understand how the disclosed embodiments can be implemented with vehicle platforms.

Figure 2:
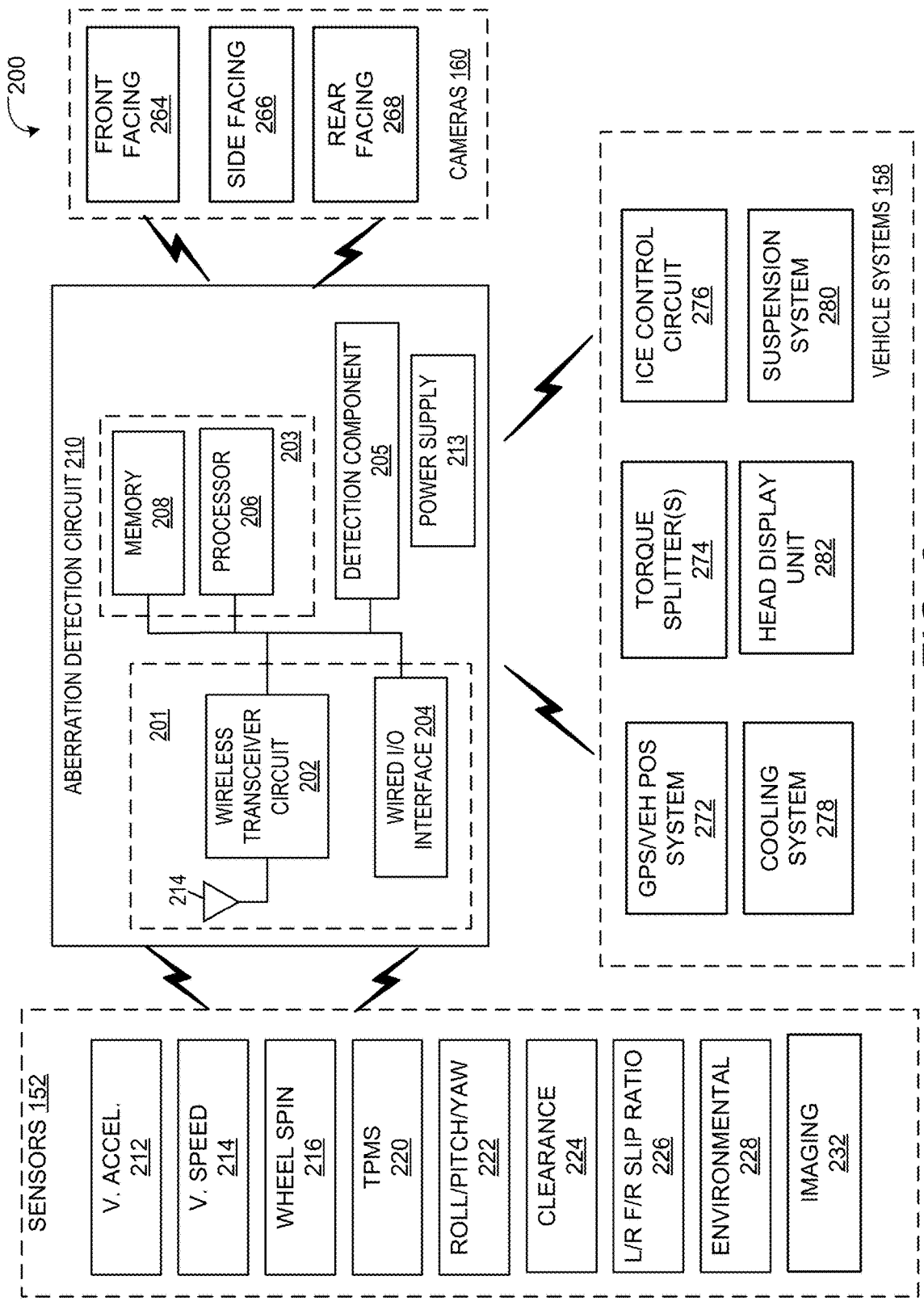
FIG. 2 illustrates an example architecture for detecting damage on the surface of a vehicle in accordance with one embodiment of the systems and methods described herein.

FIG. 2 illustrates an example architecture for detecting aberrations on the surface of a vehicle in accordance with one embodiment of the systems and methods described herein. Referring now to FIG. 2, in this example, aberration detection system 200 includes aberration detection circuit 210, a plurality of sensors 152, and a plurality of vehicle systems 158. Sensors 152 and vehicle systems 158 can communicate with aberration detection circuit 210 via a wired or wireless communication interface. Although sensors 152 and vehicle systems 158 are depicted as communicating with aberration detection circuit 210, they can also communicate with each other as well as with other vehicle systems.

This example refers to aberration detection system 200 as being part of a vehicle in which it may be implemented. Accordingly, aberration detection circuit 210 can be implemented as an ECU or as part of an ECU such as, for example electronic control unit 50. In other embodiments, aberration detection circuit 210 can be implemented independently of the ECU. In still other embodiments, portions or all of the aberration detection system 200 can be implemented separately from the vehicle. For example, some or all of the functions of aberration detection circuit 210 may be implemented in a cloud-based or other server-based system. Similarly, some or all the image data and sensor data used in the operation can be obtained through sensors at infrastructure elements or other elements external from the vehicle.

Aberration detection circuit 210 in this example includes a communication circuit 201, a decision circuit (including a processor 206 and memory 208 in this example) and a power supply 213. Components of aberration detection circuit 210 are illustrated as communicating with each other via a data bus, although other communication in interfaces can be included. Aberration detection circuit 210 in this example also includes detection component 205. Detection component 205 may be configured to gather information from vehicle sensors 152 or vehicle systems 158. This may be useful, for example, to obtain information such as acceleration and speed of the traveling vehicle, slipping or sliding of the vehicle, locations where the vehicle was driven in a given time frame, and road or traffic conditions experienced by the vehicle, to name a few.

Detection component 205 may also gather information from cameras 160, which may be configured to obtain images of surfaces of the vehicle and surrounding environment. In this example, cameras 160 include one or more front facing cameras 264, one or more side facing cameras 266 and one or more rear facing cameras 268. In various embodiments, these cameras can be positioned in a fixed manner so that they can obtain images of vehicle surfaces of interest. In further embodiments, these cameras may be positioned, whether automatically or manually, so that they can be directed to obtain images of one or more surfaces of the vehicle. In other examples, other cameras or camera configurations may be utilized.

In some embodiments, the image processing and analysis can be conducted on-vehicle by aberration detection circuit 210 using, for example, processor 206 and memory 208. In other embodiments, the information gathered can be sent to a server, such as a cloud server, or other external processing device to perform the analysis. In still further embodiments, a hybrid approach can be taken where image analysis and processing are performed in part on vehicle and in part by a remote device. Accordingly, communication circuit 201 can be used to send some or all of the pertinent obtained information to a server (e.g., server 330 in FIG. 3), mobile device (e.g., device 310), drone (e.g., drone 315), or any other electronic device for analysis.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory and may be configured to store data and other information as well as operational instructions that may be used by the processor 206 to aberration detection circuit 210.

Although the example of FIG. 2 is illustrated using processor and memory circuitry, as described below with reference to circuits disclosed herein, control circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up aberration detection circuit 210.

Communication circuit 201 includes either or both a wireless transceiver circuit 202 with an associated antenna 214 and a wired I/O interface 204 with an associated hardwired data port (not illustrated). As this example illustrates, communications with aberration detection circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by aberration detection circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 213 can include one or more of a battery or batteries (such as, e.g., Li-ion, Li-Polymer, nickel metal hydride (Ni-MH), nickel-cadmium (Ni—Cd), nickel-zinc (Ni—Zn), and nickel-hydrogen (Ni—H$_2$), to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or not otherwise be included on a standard vehicle 102 with which the aberration detection system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity, temperature, humidity, moisture, pollen levels, or other environmental conditions the vehicle is exposed to). Additional sensors, which are not depicted, can also be included as may be appropriate for a given implementation of aberration detection system 200. Information about the vehicle and vehicle surroundings can be gathered by the sensors and can be correlated with corresponding aberrations such that certain vehicle conditions and vehicle surroundings can be associated with particular types of detected aberrations.

Vehicle systems 158 can include any number of different vehicle components or subsystems used to control or monitor various aspects of the vehicle and its performance. In this example, the vehicle systems 158 include a GPS or other vehicle positioning system 272; torque splitters 274 to control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, and other vehicle systems; and head display unit 282.

The measurements from the different sensors in sensors 152 and vehicle systems 158 may be received by aberration detection circuit 210 as information for further processing. In various embodiments, communication circuit 201 can be used to provide one-or 2-way communication between aberration detection circuit 210 and one or more of sensors 152, vehicle systems 158 and cameras 160. One or more of these various components can have a dedicated communication link to the aberration detection circuit 210, or one or more of these various components can use a shared communication link.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionalities can be shared among one or more common software and hardware elements. Such a description shall not require or imply that separate hardware or software components are used to implement such features or functionality.

Figure 3:
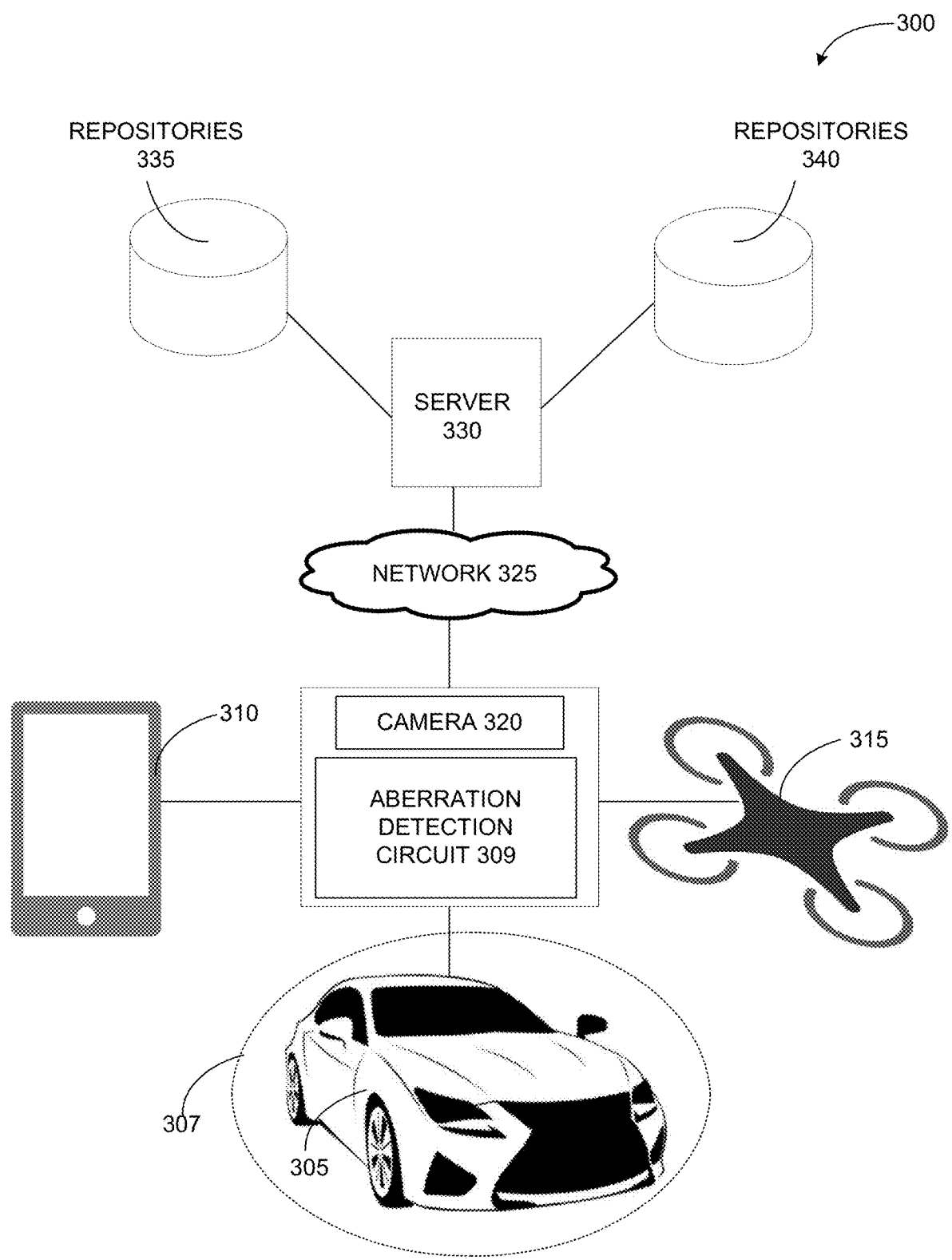
FIG. 3 illustrates an example process for detecting damage on the surface of a vehicle in accordance with one embodiment of the systems and methods described herein.

FIG. 3 is an example of a system for detecting surface aberrations on a vehicle in accordance with one embodiment. In this example system 300, one or more cameras 320 are used to obtain images of vehicle surfaces. Cameras 320 can include one or more of vehicle-mounted cameras (e.g., cameras 160), infrastructure mounted cameras or other cameras. As described above, vehicle-mounted cameras can be used to capture images of vehicle surfaces and transmit those images to an onboard component or to a server for processing. Infrastructure cameras may include, for example, cameras mounted on traffic signs, traffic lights, parking structures or dedicated camera mounting structures to capture images of a vehicle parked within their viewable range.

Consider the case of a car rental agency, for example. In this example, the agency may rely on vehicle-mounted OEM or aftermarket cameras to capture images of the vehicle during driving and when it is parked shortly after the rental period is terminated. The rental car agency may also have dedicated cameras mounted at or near the vehicle return lanes so that images of the vehicle can be captured as the renter is returning the vehicle. These dedicated cameras may be mounted, for example, on the parking structure (e.g., on structural pillars, on the ceiling, on entry and exit gates, and so on), on light fixtures or undedicated mounts positioned specifically for image capture.

As another example, consider a car-share service. In this implementation, the service may rely on vehicle-mounted cameras in a similar manner to the insurance agency. However, because cars may be returned to locations not strictly controlled by the service, the service might not be able to rely on its own infrastructure elements for aberration detection. Therefore, the car-share service may rely on cameras mounted on street signs, traffic lights, streetlights, parking meters, or other infrastructure elements proximate to the location or locations at which shared vehicles may be returned.

As yet another example, banks holding the paper to a vehicle or insurance companies may require periodic updates about the condition of a user's vehicle. Again, vehicle mounted cameras may be used as described above. Additionally, infrastructure cameras can be mounted within the driver's garage to capture images while the vehicle is parked. Where the driver parks the vehicle outdoors, these entities may rely on cameras mounted on street signs, traffic lights, streetlights, parking meters, or other infrastructure elements proximate to the location or locations at which the driver parks his or her vehicle.

The cameras and camera mounting techniques described for the various examples above are not mutually exclusive, nor are each required. As one of ordinary skill will recognize after reading this disclosure, one or more of each of the various camera types or mounting techniques can be used by any of a number of different limitations or applications. Likewise, these and other entities are not limited to the cameras or mounting types described above. In various applications other instrumentalities may be employed to capture images such as, for examples, drones, hand-held cameras, smartphone cameras and so on.

An aberration detection circuit 309 may be included to control cameras 320. For example, aberration detection circuit 309 may be configured to actuate one or more cameras to capture images of the vehicle at a predetermined time. Aberration detection circuit 309 may also direct transfer of the images to server 330 processing. Additionally, other information from the vehicle 305, such as information from one or more of sensors 152 and vehicle systems 158 can be sent to the server for processing. These can be sent directly by the vehicle 305, while in other embodiments they may be relayed by aberration detection circuit 309. In various embodiments, some or all the functionality of aberration detection circuit 309 may reside in vehicle 305, or aberration detection circuit 309 may be a dedicated component.

The example of FIG. 3 also includes a device 310 and a drone 315. As noted above, smart phones, drones, and other instrumentalities can be used to capture images and to perform some or all of the image analysis. Device 310, drone 315 or other instrumentality can include a portion or all of the aberration detection circuit 309. Thus, a drone 315, device 310 (e.g., smart phone, digital camera, tablet, laptop or other electronic computing device) can be used to implement aberration detection circuit 309 and can be used to provide one or more of cameras 320. In various embodiments, the cameras can be positioned such that a full 360° view of the vehicle can be captured as illustrated by ellipse 307. Device 310 may be used by the driver of vehicle 305, passenger, rental return agent, insurance agent, inspector, or other system user to obtain images of surfaces of vehicle 305. Drones 315 may include an unmanned aerial vehicle that obtains images of the surfaces of vehicle 305 from elevated heights; and different angles and orientations. Cameras 320 may include high-energy optics-based camera systems or other image sensors that obtain representations of surfaces of vehicle 305. Vehicle 305 may be, for example, vehicle 100 in FIG. 1.

Aberration detection circuit 309 can be configured to actuate cameras 320 depending on the implementation of the system. For example, a user may initiate the operation by a user interface in response to which the aberration detection circuit 309 coordinates image capture as well as capturing sensor information where applicable. As another example, aberration circuit 309 may be triggered based on GPS data. In this example, the GPS data may indicate the vehicle has been returned to a designated return location indicating that aberration detection is to take place. As yet another example, aberration detection circuit 309 may include sensors or communication devices to detect the presence of the vehicle at a designated location. Depending on the application, the designated location may include, for example, a rental car return location, a car-share return location, a garage, an inspection facility and so on. Image sensors, infrared sensors, lidar or other detectors can be used to detect the presence of a vehicle at a designated location, as can a GPS or other vehicle position determination system. Vehicle barcodes or QR codes, license plate scanners, RFID tags, NFC identification or other like devices can be used to identify the vehicle arriving at the designated location. The aberration detection can be triggered based on the presence of the vehicle, and the images captured and sent to the server for analysis.

Systems using vehicle cameras and infrastructure cameras, for example, may allow the analysis to be performed without the need for a human operator to position a camera or any other type of imaging taking device to inspect the vehicle. Also, using cameras that can scan the entire vehicle or large portions of the vehicle can help to avoid missing aberrations that may be difficult to detect by the naked eye. If the damage is difficult to visualize by a human, the human might not know which images to capture and might miss capturing images of relevant surfaces.

Network 325 may be a public network, such as the Internet a private network, a Virtual Private Network (VPN) or other communication network. Network 325 may include third-party telecommunication lines, such as phone lines, broadcast coaxial cable, fiber optic cables, satellite communications, cellular communications, and the like. Network 325 may include any number of intermediate network devices, such as switches, routers, gateways, servers, and/or controllers, which are not directly part of system 300 but that facilitate communication between the various parts of system 300, and between system 300 and other network-connected entities. In other embodiments, communication interfaces other than a network 325 may be used. For example, dedicated communication links can be implemented between the image capture and the server.

Server 330 may be a cloud service that receives the obtained images from the one or more various cameras. Server 330 may be a cloud server that allows scalable deployment of applications by providing a web service through which users can configure virtual machines containing the desired application or services. Server 330 may include a logical circuit configured to control the geographic location of the virtual machines, leading to latency optimization (i.e., time delay functions) and elevated levels of redundancy (i.e., duplication of critical components for increasing reliability or performance of a system). The cloud service may also include shared pools of configurable computer system resources and higher-level services that can be rapidly provisioned with minimal management effort, often over the Internet. In other applications, server 330 may be a dedicated computing device or computing resources as opposed to a cloud-based system.

Server 330 may be implemented to analyze the obtained images to determine whether surface aberrations exist. For example, server 330 may compare captured images for a vehicle with stored baseline images for the vehicle to determine whether changes to the vehicle condition have occurred. Server 330 can be configured to detect deltas between the currently captured image or images and the corresponding baseline image or images to determine whether an aberration exists. In some embodiments, machine learning techniques may be used to perform the analysis on the obtained image to determine whether surface aberrations are detected on the vehicle 305.

Whether or not machine learning-assisted analysis detects surface aberrations on the surface of vehicle 305, the results of the analysis may be sent to repositories 340 so that the outcome can be stored for reporting or record-keeping purposes. Other users can extract the determinations in repositories 340, which may be displayed such as on a graphical user interface. If surface aberrations are detected, a message can be sent to a user indicating such detection. The user may also view the image depicting the surface aberration on the display. Where action is warranted based on the presence of the aberration, such action may be taken. This may include, for example, charging the user of the vehicle for the damage, adjusting the user's rates or premiums, sending notifications to the user about the damage, and so on. Similarly, where surface aberrations are not detected, then the display may output a message indicating no surface aberrations have been detected.

Machine learning techniques may be implemented by aberration detection circuit 309 or server 330 include deep learning, supervised learning, convolutional neural network (CNN), decision tree, or linear regressions. In one example, a deep learning algorithm examines images of surfaces of vehicle and previously determined results associated with those images. Aberration detection systems that detect surface aberrations may utilize image data and other data in training and testing sets. The training and testing sets may be validated and refined to provide an aberration detection system with the ability to detect surface aberrations in an automated manner. As image data, sensor data, vehicle system data and other pertinent information are fed into the training sets, the detection and causal identification functions may be improved.

Vehicle conditions, environmental conditions, driving conditions, driver behavior and other data can be correlated to the different types of aberrations such that machine learning may also be used to predict the source of the detected aberrations. This may be used, for example, to predict driver behavior as a result of the detected aberrations, infer data about the vehicle environment as a result of the detected aberrations, infer data about a region in which the vehicle is operated, and so on. In some embodiments, information can be elicited based on a single aberration. In other embodiments, multiple aberrations can be used to infer information about the vehicle, its driver or its environment. Accordingly, machine learning techniques can be used for a variety of functions including identifying the cause of the surface aberrations; detecting surface aberrations not readily visible to the human eye; identifying driving patterns that make the vehicle more prone to damage; identifying locations that are more likely to lead to vehicle damage; identifying faulty components or manufacturing processes associated with the detected surface aberrations; and so on.

A number of different pieces of information may be collected, stored, and used for training sets for the machine learning techniques. Aberration detection system, which derives in part from the training sets, may instruct machine learning methods perform analysis on the number of different pieces of information to make more complex correlations. For example, aberration parameters described above, such as aberration geometry (e.g., size, shape, depth, pattern, etc.), aberration location (e.g., bumper, fender, quarter panel, decklid, door, rim, etc.), aberration type (e.g., scratch, crease, dent, ding, etc.) aberration severity, and other aberration parameters can be tracked, and correlated with other data. These characteristics can be correlated using machine learning techniques to identify the likelihood of an aberration exists as well as to predict a cause for an aberration based on the aberration parameters. The causes that can be tracked and correlated with resultant damage can include causes such as accident type (e.g., fender bender, scrape, curb rash, door ding etc.) accident environment (e.g., off-road driving, parking lot, street parking, slippery conditions, etc.) and accident geography (e.g., particular parking lot, particular city or region, particular roads, geofence, etc.).

Accompanying information may also include: the source of the image (e.g., image taken by a camera on vehicle 305, device 310, or drone 315); a time stamp of the image; that height or distance at which the image is obtained (e.g., drone 315 is 5 feet above bumper of vehicle 305); and (iii) location at which the image of vehicle 305 is taken. In turn, the machine learning may make more complex correlations to further enhance the capabilities of the aberration detection system.

The machine learning may trigger the creation of metadata to understand the relevance, quality, and structure of the information/data contained within the obtained images and any other accompanying information that may be available. Subsequently, data quality procedures of the machine learning techniques, as applied by aberration detection circuit 210, may eliminate duplicate information, match common records, and standardize formats.

The training data set may be generated by the machine learning methods compiling contents from repository 335. The training data set may also include information created from user input provided through a graphical user interface. As stated above, repository 335 may contain categorized data sets. The machine learning techniques, such as supervised learning or deep learning, may split the data sets into different classifications when constructing training and testing sets.

One analysis element may be different color values at pixel locations of a captured image as compared to a reference image. This may include, for example, hue, saturation and luminance (HSL) values for one or more pixels of the image. The first classification may be a color index formed that details colors as a continuous spectrum of colors. The aberration detection system as a result of training may readily distinguish different colors from each other, such as, for example, black from primer, green from rust, etc. Training sets may also distinguish different shades within a pure color (e.g., light blue and dark blue) and slight differences between colors (e.g., dark blue (~450 nanometers (nm)) and violet (~455 nm) may have similar wavelengths. Colors with similar wavelengths may be difficult to distinguish, especially to the human eye. Similarly, the aberration detection system as a result of training may distinguish variations in color saturation or luminance that may also indicate an aberration. The aberration detection system may also be configured to increase image sensor resolution, or move the image sensor closer to a suspect area such that a larger number of pixels or a higher pixel density is available to investigate a surface area with a possible collaboration.

A second analysis element may be a texture of surfaces. The texture of vehicle surfaces can be captured and analyzed to predict the presence of an aberration while accounting for different material types. Rough surfaces (e.g., as may be detected by pixel-to-pixel variations in HSL, may be normal for interior fabrics, dash coverings or other textured surfaces of the vehicle, while rougher or non-homogenous sections on a body panel may indicate surface aberrations. Stated another way, the machine learning analysis may account for the type of material being studied when determining if an image indicates surface aberrations.

Another analysis element may be based on vehicle type or use type. The aberration detection system may use vehicle type of vehicle use to determine where to focus its analysis. For example, off-road vehicles may be more prone to undercarriage damage, city-driven vehicles may be more prone to scratches and dents on the sides of the vehicle. Accordingly, the aberration detection system may be configured to focus its analysis on certain areas of the vehicle based on vehicle type or vehicle usage.

Environmental conditions, such as sun light, street lights, and precipitation may impact and even obscure the appearance of colors and textures of surfaces of vehicle 305. For example, a reflective surface in bright light may decrease the signal-to-noise ratio at the image sensor thereby obscuring a surface aberration. Images of surfaces of different colors exposed to different environmental conditions, reflective surfaces, and dull surfaces may be contained within repository 335 and used for training or used as a basis for the comparison. These extracted images may be used to train the machine learning to correct for these factors to identify the actual parameters (e.g., HSL parameters) of the surface.

Baseline images of various vehicle surfaces (e.g., rubber, metal, plastics, leathers, cloth, glass, and painted surfaces) may be stored for comparison purposes. As noted above, before and after comparisons can be made to detect whether the surface aberration exists. Baseline images of new or undamaged surfaces can be maintained to provide a basis for the comparison, whether or not the comparison utilizes machine learning techniques. These baseline images, as with other baseline images, may be identified as belonging to particular individual vehicles (i.e., to a specific unit), particular vehicle makes/models, or particular material types (e.g., seat fabrics, dash covers, body panels, bumper covers, grills, etc.). Accordingly, a more accurate comparison can be made. For example, for a rental or car-share application, baseline images can be captured and stored each time the vehicle was used. Therefore, a current detection operation can compare current captured images with images captured during the most-recent prior use such the damage caused by the current user can be detected, and damage caused by a prior user would not be attributed to the current user. As another example, baseline images can be stored for particular makes or models of the vehicle such that surfaces of a vehicle being inspected can be compared to baseline surfaces of the same make and model. This can provide a more accurate comparison.

The trajectory, shape, mass, color and other parameters of the object impacted the vehicle may be determined from characteristics of the surface aberration. By comparing the images and finding image deltas, the object or event that caused the surface aberration may be identified. The identification and image deltas accompanying the identifications may also be trained into the machine learning system. As with other causes, environmental conditions and factors, by compiling identifications of different objects and object characteristics from known events, a spectrum of causes and events that led to surface aberrations may be constructed and used to train models.

Additional data that may be stored and used may include information such as driver profiles collected for individual drivers over time, material profiles and vehicle profiles. For example, data collected over time may indicate that a particular driver is more prone to accidents or more prone to subjecting his or her vehicle to particular aberrations; certain geographic regions, areas, parking lots, streets, etc. are more dangerous than others and more likely to lead to vehicle aberrations; certain materials (e.g., types of class, types of paint coatings, bumper cover materials, etc.) are more susceptible to damage while others are more resilient; and certain manufacturing or fabrication processes are more susceptible to damage while others are more resilient.

While not necessarily in this order, deep learning is a type of machine learning technique that may be applied for aberration detection and may include the following machine learning (ML) functions. Images and associated stored data already correlated to those images can be used to train the machine learning algorithms. For example, images with known aberrations can be used to train machine learning algorithms to detect or predict the likelihood of the existence of aberrations. As another example, identified aberrations and their known causes can also be used to train machine learning our beams to predict the cause of damage based on the characteristics of the aberration detected. Machine learning techniques may also be used to refine the aberration detection system by repeating the training functions with additional data and by using external validation to validate or correct the output of the analysis. For example, the determinations of the aberration detection system may be validated or invalidated by further investigation, which characterize the determinations of surface aberration as true positive, false positive, true negative, and false negative (i.e., a confusion matrix).

By refining and validating the aberration detection system, the data sets in repositories 335 and 340 may be expanded. Thus, the characteristics and features used to derive training and testing matrixes may account for more detailed classifications.

Figure 4:
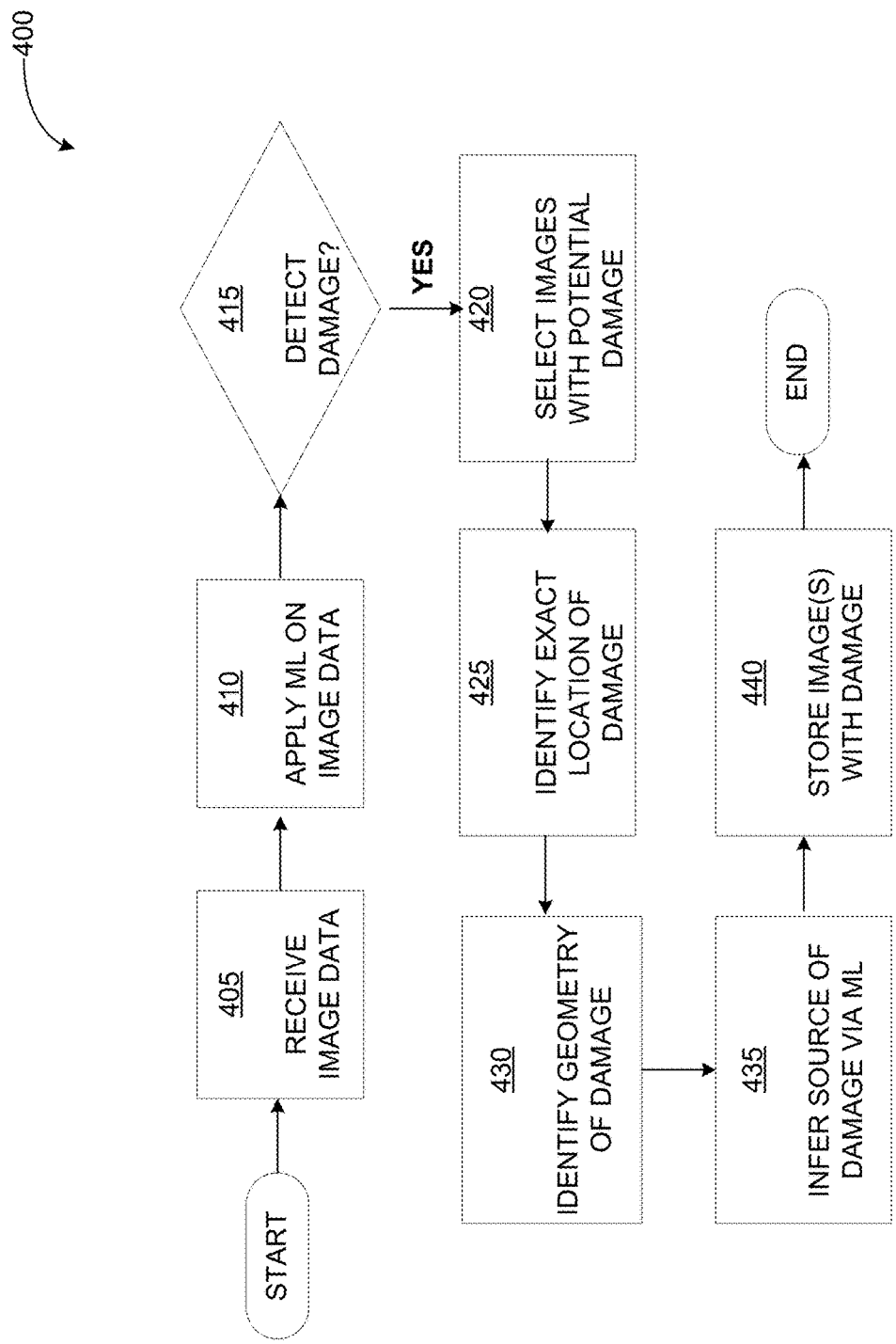
FIG. 4 illustrates an example process for detecting damage on the surface of a vehicle in accordance with one embodiment of the systems and methods described herein.

FIG. 4 is an example process for detecting damage on the surface of a vehicle. The operations in flowchart 400 support the detection of damage on the surface of a vehicle, surface anomalies, or other types of surface aberrations in the vehicle. The example process may be used in a number of applications including applications for manufactures, car rental agencies, insurance companies, and so on, to determine if there is damage to a vehicle of interest.

At operation 405, the aberration detection system receives image data. As described with reference to FIGS. 2 and 3, the images may be captured using on vehicle cameras, infrastructure cameras drones, and other image sensors. The obtained images may be taken at different angles, orientations, heights, and distances from vehicle. The image data may be received by the aberration detection system for processing.

The aberration detection system in this example applies machine learning to analyze the image data at operation 410 to detect whether there is an aberration. As described above, the captured images can be compared to baseline images to determine whether there are deltas or other changes (e.g., changes in pixel values) that indicate a surface aberration. For example, deviations exceeding determined threshold values may indicate that vehicle surface captured by the image as a surface aberration. As a further example, a 3-dimensional HSL vector can be constructed for pixels exhibiting deltas as compared to the baseline image and the magnitude and direction of the vector can be used to determine whether an aberration exists. As described above, machine learning techniques can be applied to improve the accuracy of the detection. As also described above, the aberration detection can be performed by an aberration detection circuit within the vehicle, an aberration detection circuit external to the vehicle (e.g. at the server), or a combination of both.

If an aberration is detected as shown at operation 415, the process continues at operation 420 where images with potential damage are flagged or selected. Whether or not aberration is detected based on a given image, the system may continue with operations 405 and 410 to receive image data and analyze the image data to determine whether an aberration exists.

At operation 425, selected images may be analyzed to identify the location of the aberration on the surface. This may include, for example, identifying the surface being examined (e.g., a particular body panel, a particular seating surface, a particular interior door panel, and so on), as well as the location (e.g., index Y coordinates) on that surface.

At operation 430, the system identifies the geometry of the damage. This can include, for example, identifying a shape and size of the damage, the depth of the damage, and the orientation of the damage.

At operation 435, the system uses machine learning techniques to infer the source of the damage. The training set may be the basis for the aberration detection system to as quantify the different magnitudes (or severity) of damaged surfaces. For example, a surface with a circular dent on a door panel may be correlated with impact caused by a door ding, whereas a bumper cover with shallow scratches toward the bottom can be correlated with scraping the top of a curb or concrete parking stopper.

By identifying the cause or event of the damage, the system can determine or infer driving patterns, including driver behavior, vehicle locations, vehicle usage, and other patterns. For example, the system may determine that a vehicle intended for city use was used off-road, which may be in violation of a rental contract. As another example, where the system determines that a driver is prone to door dings, communications can be sent to the driver to instruct the driver to be more careful where she or he parks the vehicle.

At operation 440, the system can store the image with the damage in data storage and it may inform various parties of the damage. For example, a car rental agency can be informed of the damage inflicted to a vehicle by one of its renters. This information can be used to charge the renter for the necessary repairs. The system can send the image to the car rental agency (or insurance company or other entity) and to the driver as well. It can also send information regarding the likely cause of the damage. In further embodiments, the system can correlate particular aberrations and aberration degree with cost of repair such that estimates can be generated in real time regarding the cost of the damage. Investments can be used to build a driver for necessary repairs.

Where information from the driver may also be collected about the cause and other circumstances surrounding the damage, this information can be fed back to the data sets to provide further training to the machine learning algorithms.

Figure 5:
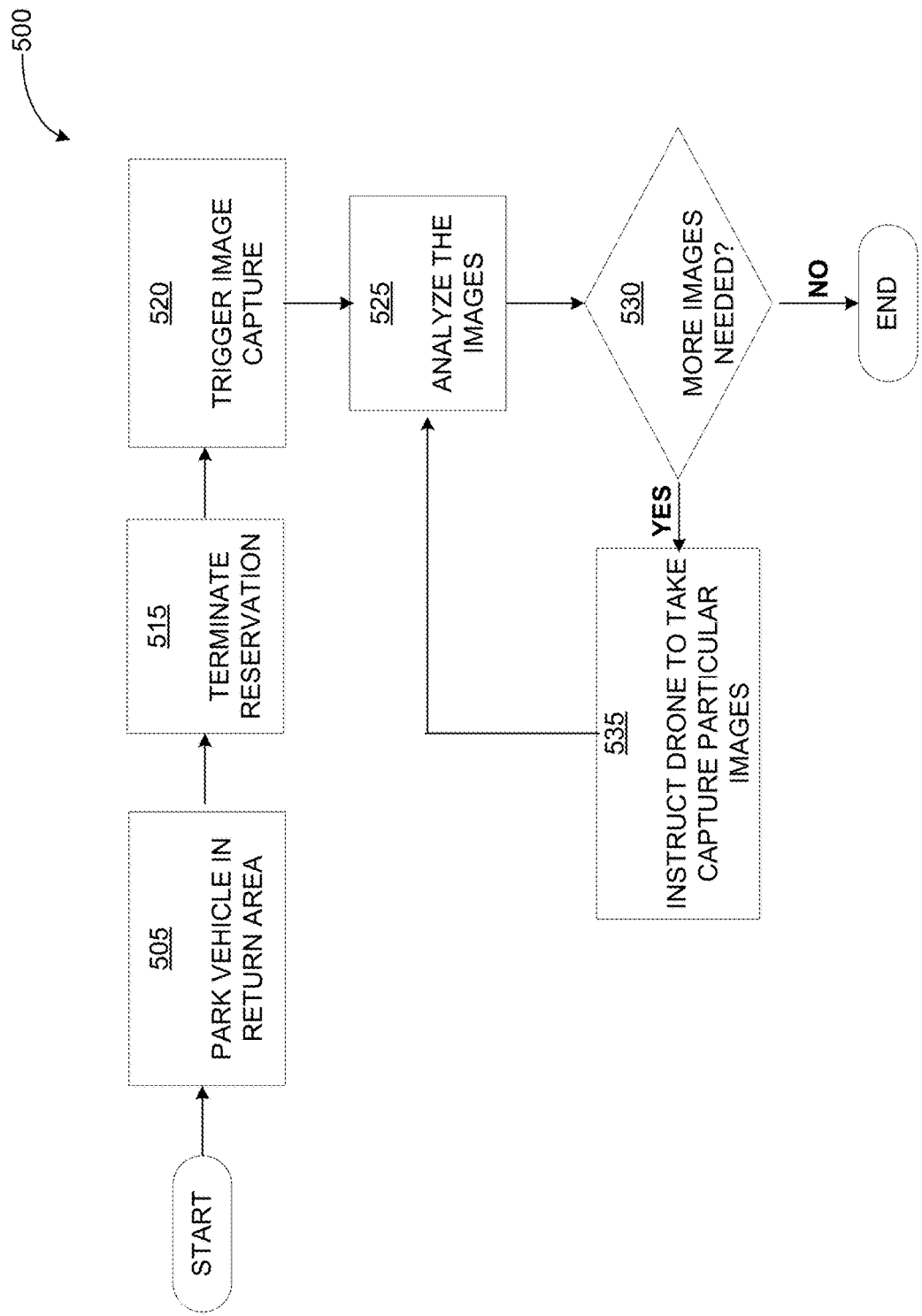
FIG. 5 illustrates an example process for improving the quality of images used to train the aberration detection system in accordance with one embodiment of the systems and methods described herein.

FIG. 5 is an example process for improving the quality of images used to train the aberration detection system. This example is described in terms of a rental vehicle being returned at the end of a rental period. At operations 505 and 515 the renter parks the vehicle in a rental return area and terminates the reservation. The system can detect the return of the vehicle such as, for example, by sensors or by the rental agent scanning the vehicle into his or her system.

At operation 520, the aberration detection system triggers the capture of images through a number of image capture devices. As described above, on-vehicle cameras, infrastructure cameras and other cameras can be used to capture images of the various vehicle services. As also described above, a drone can be used to take images of one or more sections of the vehicle.

At operation 525, the aberration detection system analyzes the images to determine the likelihood that an aberration is present on one or more surfaces. In some circumstances, it may be desirable to take additional images for further analysis or form a more complete analysis. For example, the system may detect a likelihood that an aberration is present, but the system may require higher resolution images to confirm the detection. As another example, images of a particular surface may suggest that there is further damage on other surfaces of the vehicle. In this circumstance the system may require that additional images be captured of those other surfaces. Accordingly, at operation 530, the aberration detection system determines whether further images are needed.

Figure 6:
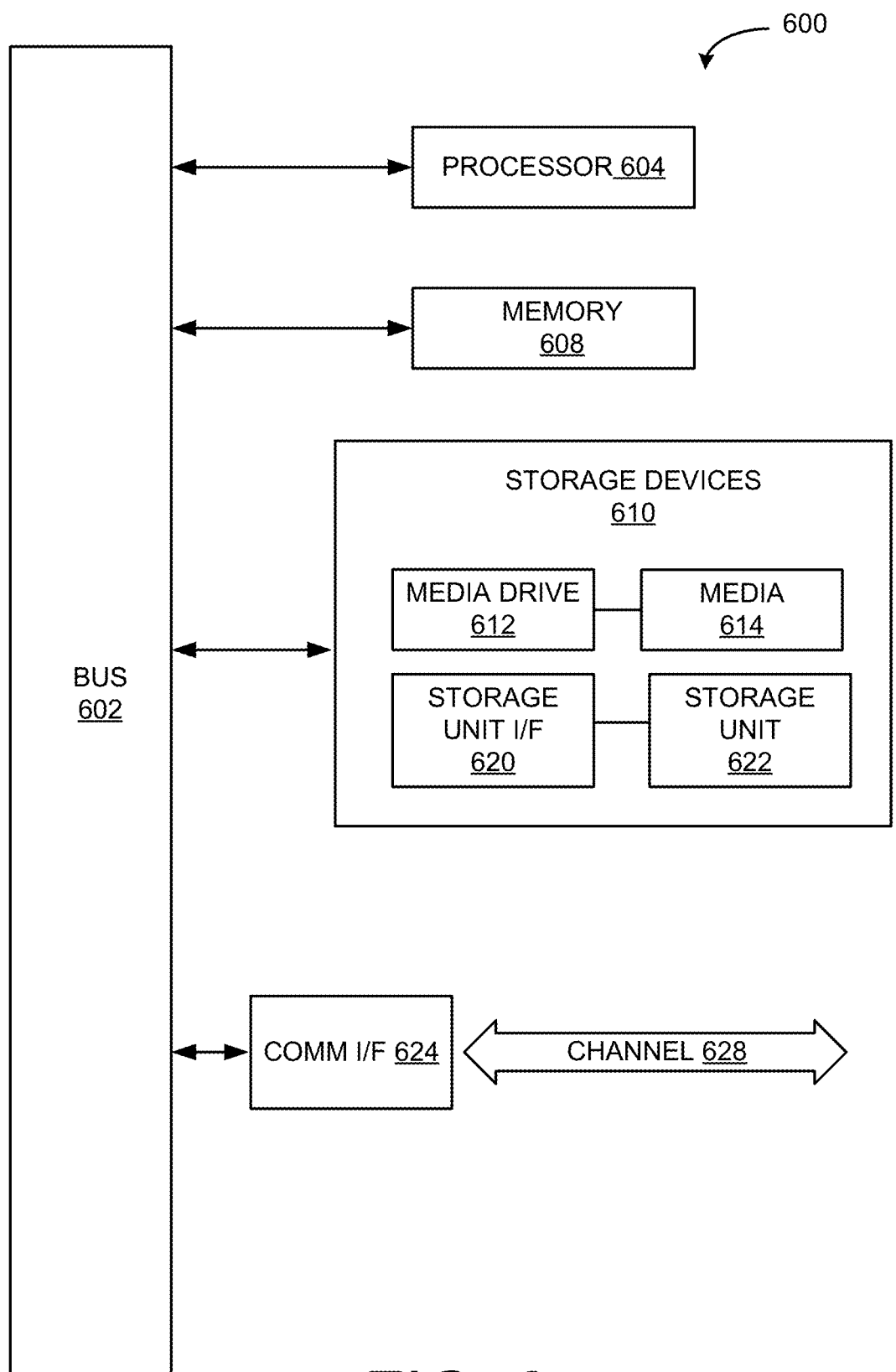
FIG. 6 illustrates an example of a computing component that may be used to implement various features of embodiments described in the present disclosure in accordance with one embodiment of the systems and methods described herein.

If further images are needed (as determined at operation 530), at operation 535, the aberration detection system instructs the one or more cameras to capture particular images. As indicated above, these can include images a particular panels or services, or they can include a zoomed in images of a given location. For example, the system may instruct a drone to fly closer to the vehicle for a higher resolution image, or it may instruct one or more image sensors to switch to a higher resolution image capture (which might not otherwise be used for bandwidth and storage space considerations). These further images can be compared to determine whether an aberration exists and the likely cause of the aberration.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor, and/or any one or more of the components making up aberration detection circuit 210 in vehicle 305; server 330; and device 310 and drone 315 controlled by detection component 205. Processor 604 might be implemented using a general-purpose or special-purpose processing engine such as, for example, a microprocessor, controller, or other control logic. Processor 604 may be connected to bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
    establishing, by an aberration detection circuit, a baseline for a vehicle surface based on a plurality of reference images of the vehicle surface;
    obtaining, by the aberration detection circuit, one or more captured images of the vehicle surface from a camera system;
    comparing, by the aberration detection circuit, the one or more captured images of the vehicle surface and the baseline for the vehicle surface;
    if one or more differences between the one or more captured images and the baseline are identified by the comparison, characterizing, by the aberration detection circuit, the one or more captured images as containing one or more aberrations on the vehicle surface; and
    identifying, by the aberration detection circuit, an aberration source for the one or more aberrations on the vehicle surface where the one or more captured images correlate with a training set associated with the aberration source.

2. The method of claim 1, further comprising:
    generating, by the aberration detection circuit, a plurality of training sets associated with one of a plurality of aberration sources, the plurality of training sets including the training set associated with the aberration source; and
    applying, by the aberration detection circuit, the plurality of training sets to the one or more captured images characterized as containing the one or more aberrations.

3. The method of claim 2, wherein generating the plurality of training sets comprises compiling a plurality of contents from a data repository, information created by user input, or a combination of both.

4. The method of claim 1, wherein determining if there are differences between the one or more images and the baseline comprises:
    analyzing, by the aberration detection circuit, a plurality of color values at each pixel location of the one or more captured images and each reference image of the baseline to determining a hue, saturation, and luminance (HSL) value for each pixel; and determining, by the aberration detection circuit, a difference between the HSL value for one or more pixel locations of the one or more captured images and a corresponding pixel location of each reference image of the baseline.

5. The method of claim 1, wherein the camera system comprises one or more cameras residing on at least one of: a drone, a device, and the vehicle.

6. The method of claim 1, further comprising associating, by the aberration detection circuit, the baseline with a specific vehicle, a specific vehicle type, a particular material type, or a combination thereof.

7. The method of claim 1, further comprising the aberration detection circuit correcting the baseline for one or more environmental conditions, the one or more environmental conditions comprising one or more of: sun light, street lights, precipitation.

8. The method of claim 1, further comprising validating a determination of one or more aberrations on the vehicle surface using a confusion matrix.

9. The method of claim 8, further comprising refining, by the aberration detection circuit, the baseline, the refining comprising:
characterizing quality of the one or more reference images;
comparing the quality of the one or more reference images to a threshold value corresponding to the image quality; and
obtaining one or more replacement reference images in response to determining the quality of the one or more reference images is below the threshold value.

10. The method of claim 8, further comprising identifying, by the aberration detection circuit, the one or more images of the one or more captured images that contain one or more aberrations, the identifying comprising:
compiling one or more features of the one or more aberrations, wherein the one or more features comprise depth, shape, and color of the one or more aberrations; and
recording accompanying information of the one or more captured images, wherein the accompanying information comprises at least one of: height at which the one or more captured images are taken and angle at which the one or more captured images are taken.

11. A vehicle, comprising:
one or more sensors, wherein each sensor provides a respective signal corresponding to an operating condition of vehicular component in the vehicle; and
an aberration detection system comprising a processing unit having non-transitory machine readable storage medium encoded with instructions executable by a hardware processor of processing unit, the machine-readable storage medium comprising instructions to cause the hardware processor to:
establish a baseline for a vehicle surface based on a plurality of reference images of the vehicle surface;
obtain one or more captured images of the vehicle surface from a camera system;
compare the one or more captured images of the vehicle surface and the baseline for the vehicle surface;
if one or more differences between the one or more captured images and the baseline are identified by the comparison, characterizing the one or more captured images as containing one or more aberrations on the vehicle surface; and
identify an aberration source for the one or more aberrations on the vehicle surface where the one or more captured images correlate with a training set associated with the aberration source.

12. The vehicle of claim 11, wherein the instructions further cause the hardware processer to:
generate a plurality of training sets associated with one of a plurality of aberration sources, the plurality of training sets including the training set associated with the aberration source; and
apply the plurality of training sets to the one or more captured images characterized as containing the one or more aberrations.

13. The vehicle of claim 11, wherein the camera system comprises one or more cameras residing on at least one of: a drone, a device, and the vehicle.

14. The vehicle of claim 11, wherein the instructions further cause the hardware processor to correct the baseline for one or more environmental conditions, the one or more environmental conditions comprising one or more of: sun light, street lights, precipitation.

15. The vehicle of claim 11, wherein the instructions further cause the hardware processor to associate the baseline with a specific vehicle, a specific vehicle type, a particular material type, or a combination thereof.

16. A non-transitory machine-readable storage medium encoded with instructions executable by a hardware processor of a computing component of a hybrid vehicle, the machine-readable storage medium comprising instructions to cause the hardware processor to:
establish a baseline for a vehicle surface based on a plurality of reference images of the vehicle surface;
obtain one or more captured images of the vehicle surface from a camera system;
compare the one or more captured images of the vehicle surface and the baseline for the vehicle surface; and
if one or more differences between the one or more captured images and the baseline are identified by the comparison, characterize the one or more captured images as containing one or more aberrations on the vehicle surface; and
identify an aberration source for the one or more aberrations on the vehicle surface where the one or more captured images correlate with a training set associated with the aberration source.

17. The non-transitory machine-readable storage medium of claim 16, wherein the computer component is further configured to:
generate a plurality of training sets associated with one of a plurality of aberration sources, the plurality of training sets including the training set associated with the aberration source; and
apply the plurality of training sets to the one or more captured images characterized as containing the one or more aberrations.

18. The non-transitory machine-readable storage medium of claim 16, wherein the camera system comprises one or more cameras residing on at least one of: a drone, a device, and the vehicle.

19. The non-transitory machine-readable storage medium of claim 16, wherein the instructions further cause the hardware processor to correct the baseline for one or more environmental conditions, the one or more environmental conditions comprising one or more of: sun light, street lights, precipitation.

20. The non-transitory machine-readable storage medium of claim 16, wherein the instructions further cause the hardware processor to associate the baseline with a specific vehicle, a specific vehicle type, a particular material type, or a combination thereof.

\* \* \* \* \*